(12) United States Patent
Fluit

(10) Patent No.: US 7,515,725 B2
(45) Date of Patent: Apr. 7, 2009

(54) ELECTRONIC BATTERY-POWERED HEARING INSTRUMENT, AND METHOD FOR OPERATING SUCH A HEARING INSTRUMENT

(75) Inventor: Martin Fluit, Männedorf (CH)

(73) Assignee: Phonak AG, Stafa (CH)

( * ) Notice: Subject to any disclaimer, the term of this patent is extended or adjusted under 35 U.S.C. 154(b) by 778 days.

(21) Appl. No.: 10/794,018

(22) Filed: Mar. 5, 2004

(65) Prior Publication Data

US 2005/0196003 A1 Sep. 8, 2005

(51) Int. Cl.
*H03F 3/04* (2006.01)
*H04R 25/00* (2006.01)
*H02H 11/00* (2006.01)

(52) U.S. Cl. ............... 381/312; 381/323; 361/246; 330/297

(58) Field of Classification Search ......... 381/312, 381/323; 361/246; 330/285, 10, 251, 297
See application file for complete search history.

(56) References Cited

U.S. PATENT DOCUMENTS

| | | | | |
|---|---|---|---|---|
| 4,409,559 A | * | 10/1983 | Amada et al. | 330/295 |
| 4,473,757 A | | 9/1984 | Farago | |
| 5,481,211 A | | 1/1996 | Vietze | |
| 5,623,550 A | | 4/1997 | Killion | |
| 5,661,420 A | * | 8/1997 | Killion et al. | 327/29 |
| 6,157,252 A | * | 12/2000 | Compton et al. | 330/10 |
| 6,462,929 B2 | * | 10/2002 | Compton et al. | 361/246 |

FOREIGN PATENT DOCUMENTS

| | | |
|---|---|---|
| DE | 40 19 737 A | 1/1992 |
| EP | 677 408 A5 | 5/1991 |

* cited by examiner

*Primary Examiner*—Wayne R Young
*Assistant Examiner*—Dionne H Pendleton
(74) *Attorney, Agent, or Firm*—Pearne & Gordon LLP

(57) ABSTRACT

In a method for operating an electronic battery-powered hearing instrument, the following steps are performed:
providing primary function means with power from the battery via a first power supply terminal and a second power supply terminal, and via a rectifier circuit for providing a positive supply voltage and a negative supply voltage regardless of the polarity of the battery relative to the first and second power supply terminal,
inferring the status of an input means, wherein a first terminal of the input means is electrically connected to the first power supply terminal, and a second terminal, of the input means is electrically connected to an input line, from an input voltage, that is, a voltage of the input line.

A programming device for a hearing instrument according to the invention and a method for operating a programming device are adapted to the possibility of the hearing aid having an inverted power supply. They are configured to detect the polarity of the battery or other power supply, or, correspondingly, the status of the hearing aid's rectifier.

20 Claims, 4 Drawing Sheets

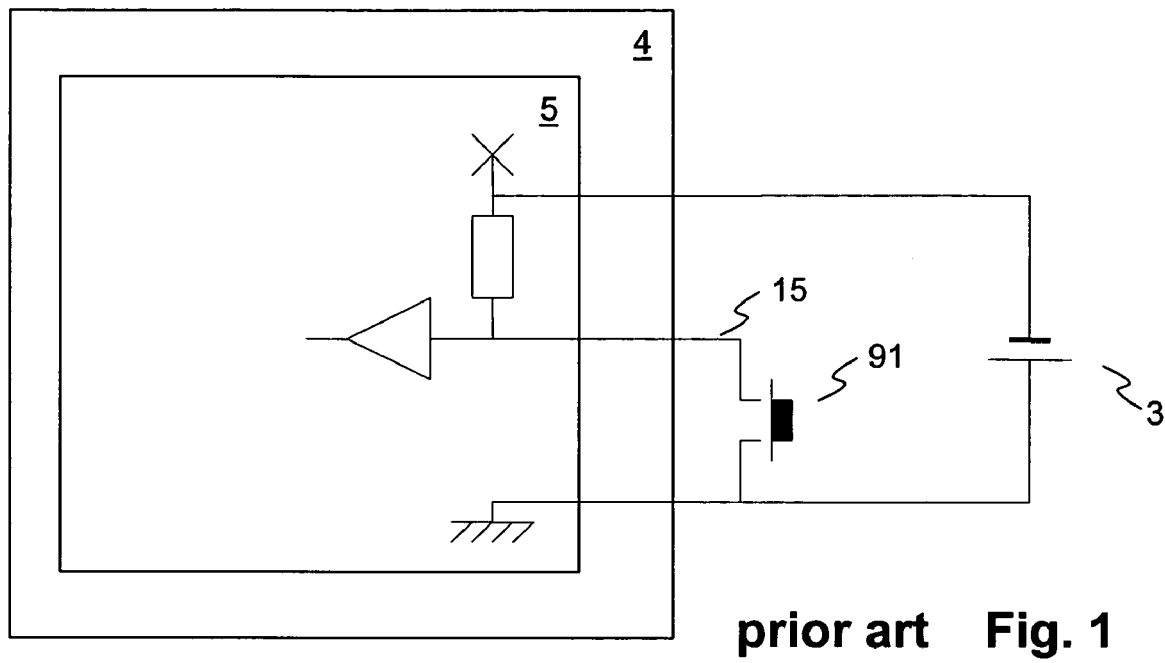
prior art   Fig. 1
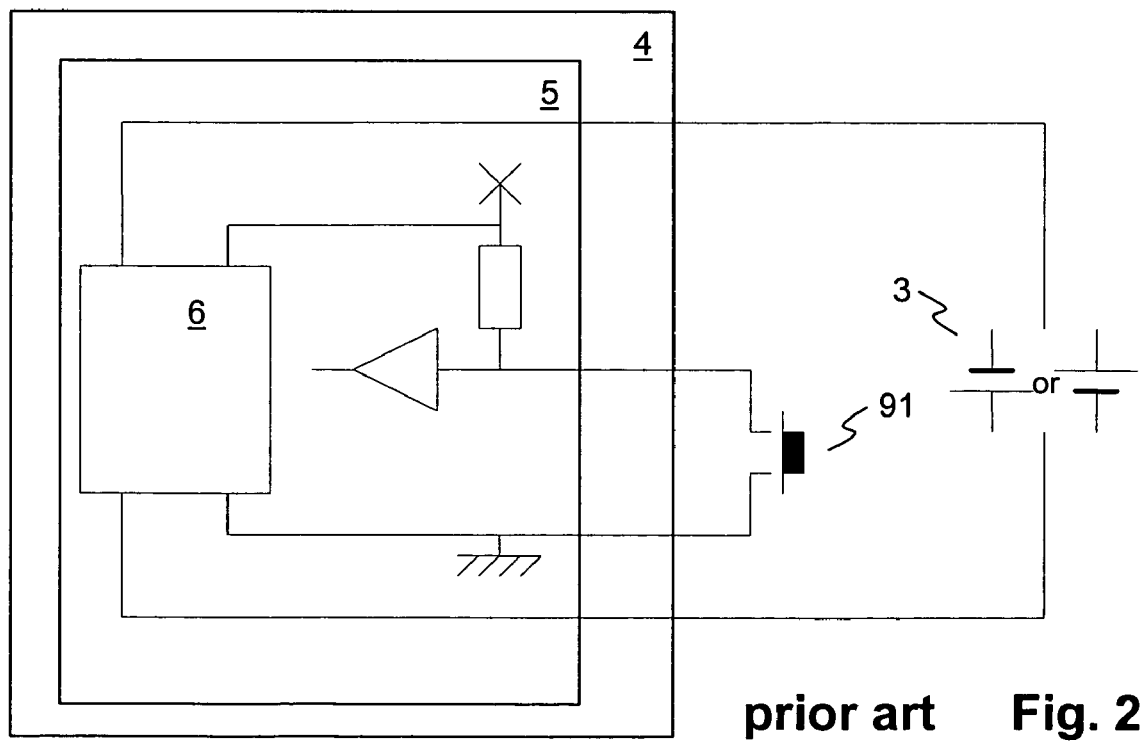
prior art   Fig. 2

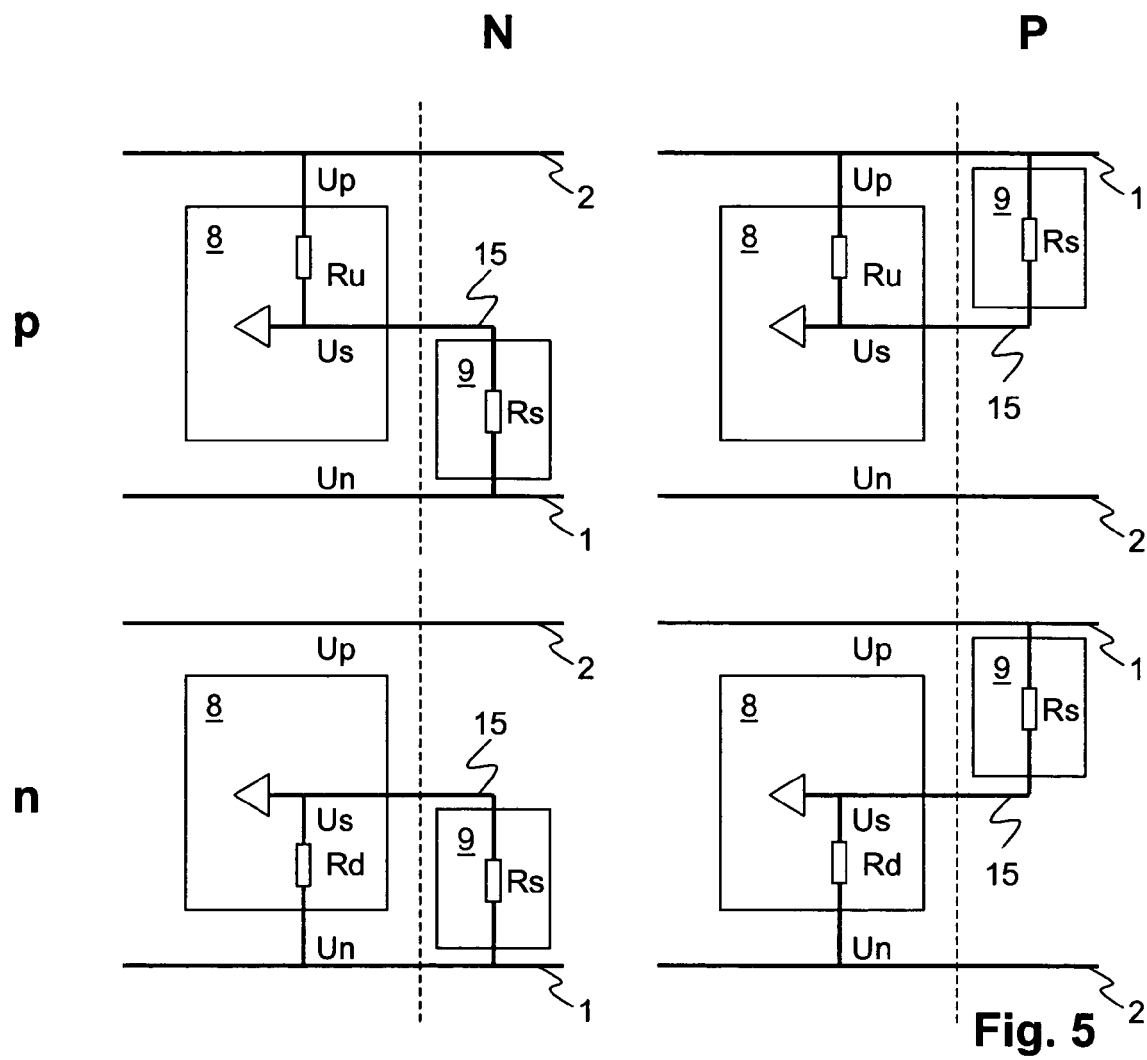
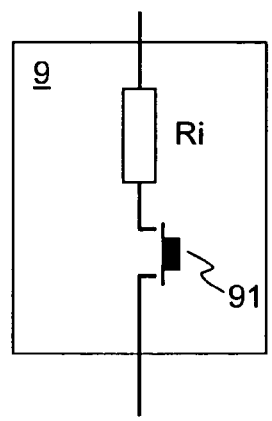
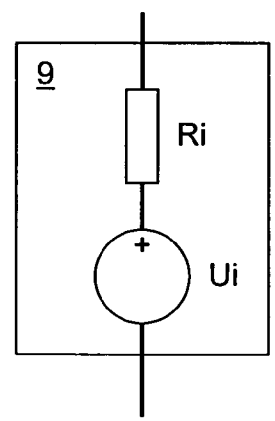
Fig. 6    Fig. 7

ELECTRONIC BATTERY-POWERED HEARING INSTRUMENT, AND METHOD FOR OPERATING SUCH A HEARING INSTRUMENT

FIELD OF THE INVENTION

The invention relates to an electronic battery-powered hearing instrument, and to a method for operating such a hearing instrument, as described in the preamble of the corresponding independent claims. The invention further relates to a programming device for a hearing instrument and a method for operating such a programming device.

BACKGROUND OF THE INVENTION

Many battery-powered hearing instruments or hearing devices provide access to the battery in order too allow replacement by a user. It may then happen that small batteries, especially disc-type batteries used in e.g. watches and in particular in hearing aids, are inserted the wrong way around mechanically. As a result, their electrical polarity with respect to the device's normal operating condition is inverted, that is, the positive terminal of the battery is connected to the negative power terminal of the device, and the negative terminal of the battery is connected to the positive power terminal of the device. The device will not operate and may even be damaged.

In order to overcome this problem, U.S. Pat. No. 5,623,550 proposes a rectifier circuit that accepts, at a pair of input terminals, a power supply whose polarity may be oriented either way, and provides, at a pair of output terminals, a voltage with a predefined polarity. In order to reduce losses—as compared to a diode rectifier bridge—the rectifier circuit comprises two transistor bridge circuits, with e.g. MOSFET transistors. The transistor switches are opened or closed in order to connect the input and output terminals according to the polarity at the input terminals.

The term "hearing instrument" or "hearing device", as understood here, denotes on the one hand hearing aid devices that are therapeutic devices improving the hearing ability of individuals, primarily according to diagnostic results. Such hearing aid devices may be Outside-The-Ear hearing aid devices or In-The-Ear hearing aid devices. On the other hand, the term stands for devices which may improve the hearing of individuals with normal hearing e.g. in specific acoustical situations as in a very noisy environment or in concert halls, or which may even be used in context with remote communication or with audio listening for instance as provided by headphones.

The hearing devices as addressed by the present invention are so-called active hearing devices which comprise at the input side at least one acoustical to electrical converter, such as a microphone, at the output side at least one electrical to mechanical converter, such as a loudspeaker, and which further comprise a signal processing unit for processing signals according to the output signals of the acoustical to electrical converter and for generating output signals to the electrical input of the electrical to mechanical output converter. In general, the signal processing circuit may be an analog, digital or hybrid analog-digital circuit, and may be implemented with discrete electronic components, integrated circuits, or a combination of both.

Most hearing instruments have one or more manual switches. These can be used for instance to toggle programs or to increase/decrease the volume of the hearing instrument. In order to detect whether a switch has been pushed or not, the simple circuitry of FIG. 1 can be used, in which a first terminal of the switch is connected to the ground of the device, and a second terminal of the switch is connected, via a pull-up resistor, to the supply voltage of the device. The voltage at the second terminal of the switch indicates the state of the switch.

When used in a device comprising a rectifier circuit as described above, the circuit according to FIG. 1 can not be used, since it is not known whether the terminal that the switch is connected with shall carry—according to the way the battery is inserted—the ground or the supply voltage of the device. One way to solve this problem is to connect the first terminal of the switch to a ground terminal that is provided as an output of the rectifier, as shown in FIG. 2.

In many hearing instruments the integrated circuits (ICs) and the passive components like surface mounted device (SMD) resistors and capacitors are combined in a subassembly or electronic circuit assembly, also called a hybrid circuit. Such a hybrid circuit is combined with electromechanical components such as manual switches, and electro-acoustic components such as microphones and loudspeakers to constitute a hearing instrument.

It is desirable to minimise the number of input/output (IO) contacts that are needed to interface the hybrid circuit with the other components.

The same issues arise if the switch is replaced or supplemented by an analog input, such as a variable resistor for volume control, or by an active input device, such as a programming device that applies a bit sequence and transmission control signals to separate connections.

DESCRIPTION OF THE INVENTION

It is therefore an object of the invention to create an electronic battery-powered hearing instrument of the type mentioned initially and comprising an electronic circuit assembly with minimal number of IO contacts. A further object of the invention is to provide a method for operating such an apparatus or component in order to determine the status of an input device regardless of a polarity with which power is provided to the apparatus or component. Yet a further object of the invention is to provide a programming device for a hearing instrument having a power supply with unknown polarity and a minimal number of IO contacts, and a method for operating such a programming device.

These objects are achieved by an electronic battery-powered hearing instrument, and a method for operating such a hearing instrument, a programming device for a hearing instrument and a method for operating such a programming device according to the corresponding independent claims.

According to the inventive method for operating an electronic battery-powered hearing instrument, the following steps are performed:
  providing primary function means with power from the battery via a first power supply terminal and a second power supply terminal, and via a rectifier circuit for providing a positive supply voltage and a negative supply voltage regardless of the polarity of the battery relative to the first and second power supply terminal,
  inferring the status of an interface means, wherein a first terminal of the interface means is electrically connected to the first power supply terminal, and a second terminal of the interface means is electrically connected to an interface line, from an input voltage, that is, a voltage of the interface line.

An electronic battery-powered hearing instrument according to the invention comprises a first power supply terminal and a second power supply terminal arranged to contact a battery, a rectifier circuit for providing a positive supply voltage and a negative supply voltage regardless of a polarity of the battery relative to the first and second power supply terminal, an electronic circuit assembly comprising the rectifier circuit and primary function means, the primary function mean,s being arranged to be powered by the positive and negative supply voltage, and at least one interface means, wherein, for each interface means, a first terminal of the interface means is electrically connected to the first power supply terminal, and a second terminal of the interface means is electrically connected to a corresponding interface line which is electrically connected to an inference means arranged on the electronic circuit assembly and configured to determine a status of the interface means from an input voltage, that is, from a voltage of the input line.

The interface means may be configured for bidirectional communication, or it may be suited only for the input of information into the hearing aid, e.g. by a switch or a variable resistance. In the latter case, it shall also be called input means.

The inventive method and device provide allow to use only a single IO contact of an electronic circuit assembly when an input means comprising two terminals is connected to the electronic circuit assembly. It is not necessary to provide an IO contact for a ground or reference voltage, since the status of the interface means, e.g. the position of a switch or variable resistance, is determined regardless of the polarity of the power supply terminal to which the first terminal of the interface device is connected.

As a result, a low number of IOs on the electronic circuit assembly allows further miniaturization. A low number of IOs, also allows larger soldering areas for individual IOs. This in turn increases the reliability and/or simplifies the manufacturing process of the apparatus.

The status of the rectifier circuit—which corresponds to the polarity of the battery—may be determined explicitly by corresponding means, and this status information used in interpreting the signal voltage at the interface line. In other preferred embodiments of the invention, the status of the interface means is determined directly without need for explicit knowledge of the rectifier status.

In order to explicitly determine the status of the rectifier circuit, a comparison means such as a comparator is arranged to compare a voltage at one of the power supply terminals to either the positive or to the negative supply voltage provided by the rectifier circuit. If the voltages are substantially equal, taking into account an internal resistance of the rectifier circuit, then said power supply terminal is known to be switched to the bus carrying said supply voltage.

The supply voltage for at least some circuits within the hearing aid may be stepped down in order to reduce power consumption. In this case, it is simplest to compare the negative power supply voltage to the voltage at both power supply terminals. If the reduced positive power supply voltage is compared with the voltage at at both power supply terminals, then the polarity of the difference voltage indicates the orientation of the battery and the rectifier status.

Another way to explicitly determine the status of the rectifier circuit is by alternately switching the input line to a pull-up resistor connected to the positive supply line or to a pull-down resistor connected to the negative supply line. Depending on the values of the two voltages measured at the input line and corresponding to these two states, the status of the input means and optionally the status of the rectifier circuit is inferred. This step involves comparing the voltage of the input line with at least one of the positive or the negative supply voltage, and determining whether the values compared are substantially the same, and/or whether the input voltage lies in an intermediate range between the negative positive supply voltage.

In a preferred embodiment of the invention, a hearing aid is configured to communicate bidirectionally with a programming device. The hearing aid then comprises at least two input/output lines, each with an associated IO contact, and each with associated circuitry for determining the status of an associated input/output means which is part of the programming device. For example, one of the two IO lines is used to provide a clock signal, the other for providing a serial data signal, implementing a serial communication bus.

A programming device for a hearing aid according to the invention and a method for operating a programming device are adapted to the possibility of the hearing aid having an inverted power supply. They are configured to detect the polarity of the battery or other power supply, or, correspondingly, the status of the hearing aid's rectifier. This can be done by having the programming device, through a programming cable, contacting both power supply terminals of the hearing aid. Alternatively, only one power supply terminal is contacted. The corresponding line serves as a reference for one or more communication lines. In order to determine the polarity of the power supply, the programming device then compares the voltage of at least one communication line with the reference line voltage. Assuming that the communication line is pulled by the hearing aid to the hearing aid's positive supply voltage, then the comparison indicates whether the reference line corresponds, in the hearing device, to the positive or negative supply voltage.

Instead of pull-up and pull-down resistors, current source or current sink circuits may be implemented.

In further preferred embodiments of the invention, the second terminal of the input means is connected to a resistance leading to the second power supply terminal. By having the diverse resistance values designed appropriately, both the state of the input means and optionally the status of the rectifier circuit are inferred from the input voltage.

In further preferred embodiments of the invention, several input means are present, a first subset of which uses one power supply terminal as a reference while a second subset uses the other power supply terminal as a reference. Then, in the terminology used in the application, with respect to the first subset, the one power supply is the "first power supply terminal", whereas with respect to the second subset, the other power supply terminal is the "first power supply terminal". The rectifier status must be detected only once, and the inference means corresponding to each input means adapted accordingly.

Further preferred embodiments are evident from the dependent patent claims. Features of the method claims may be combined with features of the device claims and vice versa.

BRIEF DESCRIPTION OF THE DRAWINGS

The subject matter of the invention will be explained in more detail in the following text with reference to preferred exemplary embodiments which are illustrated in the attached schematical drawings, in which:

FIG. 1 shows an input circuit according to the state of the art;

FIG. 2 shows an input circuit for a device comprising a rectifier circuit powering the device;

FIG. 5 shows different configurations of input means and inference means;

FIGS. 6 and 7 show alternative embodiments of input means;

The reference symbols used in the drawings, and their meanings, are listed in summary form in the list of reference symbols. In principle, identical parts are provided with the same reference symbols in tie figures.

DETAILED DESCRIPTION OF PREFERRED EMBODIMENTS

Figure 3:
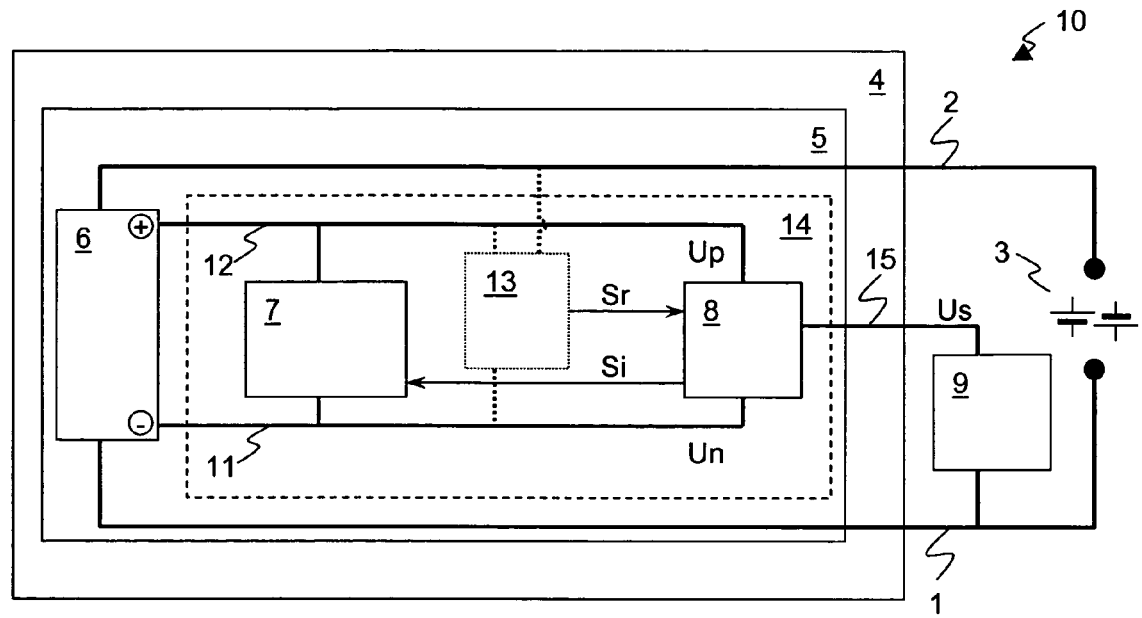
FIG. 3 shows a structure of a device according to the invention.

FIG. 3 schematically shows a structure of a device, in particular a hearing aid 10 according to the invention. The hearing aid 10 comprises an electronic circuit assembly 4 which is connected to external components such as a battery 3 and at least one input means 9. The battery 3 is contacted by a first power supply terminal 1 and a second power supply terminal 2, wherein the polarity of the battery 3 with respect to said terminals may be either way. The thick lines in the Figures denote electrical connections, and the crossings of said lines over the boundary of the electronic circuit assembly 4 correspond to IO contacts of the electronic circuit assembly 4. The electronic circuit assembly 4 comprises a rectifier circuit 6 with input terminals that are electrically connected to the first power supply terminal 1 and the second power supply terminal 2 respectively. The rectifier circuit 6 comprises output terminals that have a defined polarity and are electrically connected to a negative supply line 11 and a positive supply line 12.

Said supply lines 11,12 are arranged to power a primary function means 7 that implements the essential functions of the hearing aid, such as signal conversion, processing and amplification and also adaptation and programming of signal processing parameters. Further connections and IO contacts related to said primary functions exist, but are not shown in the figures. With respect to the current invention, the rectifier circuit 6 also powers an inference means 8 and an optional rectifier status detection means 13. The primary function means 7, inference means 8 and rectifier status detection means 13 together are denoted as jointly powered components 14.

One or more of the jointly powered components 14 may be also powered by a reduced voltage Upr in order to reduce power consumption. For this purpose, a stepping down circuit powered through the positive and negative supply lines 11,12 powers an additional supply line carrying the reduced positive supply voltage Upr to those components requiring it.

In a preferred embodiment of the invention, the rectifier circuit 6 and the jointly powered components 14 are implemented on a single integrated circuit 5 such as an application specific IC (ASIC) which constitutes one component of the electronic circuit assembly 4. However, in other preferred embodiments of the invention, one or more of the rectifier circuit 6 and the jointly powered components 14 or their subcomponents may be implemented outside the integrated circuit 5 as further components of the electronic circuit assembly 4.

A first terminal of the input means 9 is electrically connected to the first power supply terminal 1, and a second terminal of the input means is electrically connected to an input conductor or input line 15 which is, via an IO contact of the electronic circuit assembly 4, electrically connected to the inference means 8. If the input line is arranged to transmit information in two directions, it may also be called an interface line. The inference means 8 is arranged to detect a status of the input means 9 irrespective of how the polarity of the battery 3 is oriented with regard to the first and second power supply terminals 1,2. This status is communicated to the primary function means 7 as an input status signal Si. Depending on the nature of the input means 9 and on the implementation technology, the input status signal Si may be in analog or digital form. According to different preferred embodiments of the invention, the inference means 8

- determines the input status directly, without the need to determine the polarity of the battery 3 explicitly; or
- determines the input status by first determining the polarity of the battery 3 and then determining the input status accordingly; or
- determines the input status, using information about the polarity of the battery 3 determined by means that are external to the inference means 8 itself, such as the rectifier status detection means 13.

In the first two cases listed above, the rectifier status detection means 13 is not required.

Figure 4:
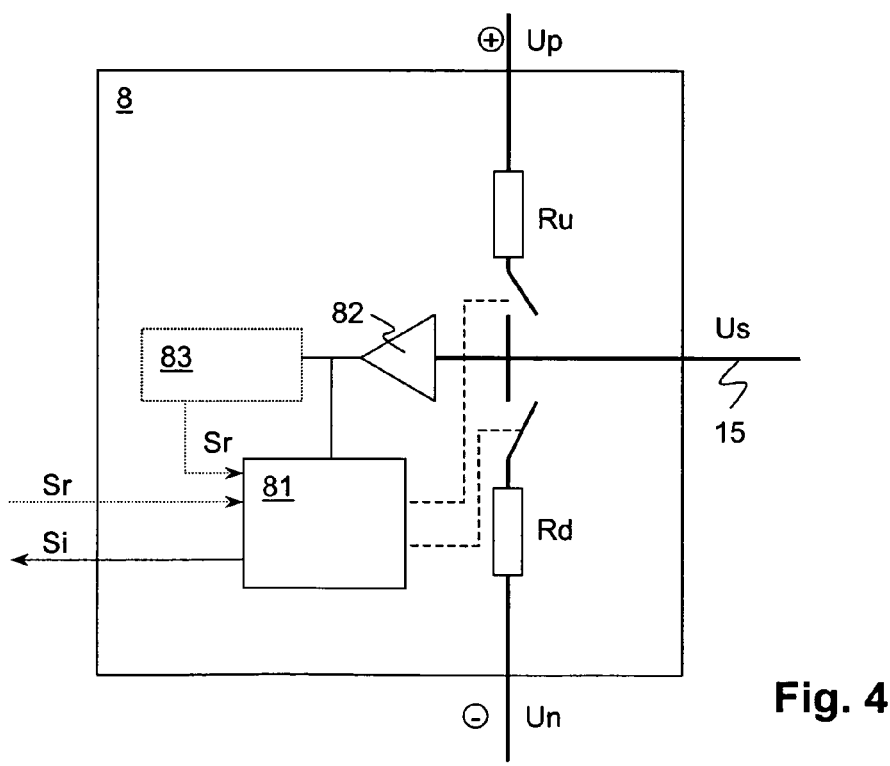
FIG. 4 shows a structure of an inference means according to one preferred embodiment of the invention.

FIG. 4 shows a structure of an inference means 8 according to one preferred embodiment of the invention. This inference means 8 comprises a high input impedance amplifier 82 for decoupling the input voltage Us from subsequent analysis means. Said analysis means take the decoupled input voltage corresponding to the input voltage as an input and comprise an optional status determining means 83 and a resistor connection controller 81 arranged to alternatively close one of two switches for connecting the input line 15 to either a pull-down resistor Rd connected to the negative supply line 11 or a pull-up resistor Ru connected to the positive supply line 12. The input voltage Us results then according to 1. which connection (pull-up or pull-down) is activated,
2. what the state of the input means 9 is, and
3. what the polarity of the battery 3 is.

The polarity of the battery 3 determines the status of the rectifier circuit 6. Said status is detected either by the rectifier status detection means 13 mentioned earlier, or alternatively by the status determining means 83.

As a basis for the following case analysis, FIG. 5 shows different configurations of input means 9 and inference means 8. Only those components of said means that are relevant for the analysis are shown. The left column of the figure, labeled "N" shows two configurations in which the first terminal of the input means 9 is connected to the power supply terminal that is switched, via the rectifier circuit 6, to a connection with the negative supply line 11. For simplicity's sake, the rectifier circuit 6 is not drawn, and the power supply terminals and supply lines are shown as switched, at the location indicated by the dashed line, according to the state of the rectifier circuit 6. Correspondingly, the right column, labeled "P" shows, for each row, the corresponding configuration resulting when the battery 3 is inverted with respect to the configuration of column "N".

The row labeled "p" corresponds to configurations in which the input line 15 is connected to the pull-up resistor Ru leading to the positive supply voltage Up, and row "n" to the input line 15 being connected to the pull-down resistor Rd. The four configurations shall be labeled, from top left to bottom right, "pN", "pP", "nN" and "nP".

It immediately follows that the resulting input voltage Us for each the four configurations is (arranged in the same way as in FIG. 5. The two bracketed values in each case show the value of Us for Rs being equal to zero or infinity, respectively):

$$pN: \quad Us = \frac{UnRu + UpRs}{Ru + Rs} \quad (Un; Up) \quad pP: \quad Us = Up \quad (Up; Up)$$

$$nN: \quad Us = Un \quad (Un; Un) \quad nP: \quad Us = \frac{UnRs + UpRd}{Rd + Rs} \quad (Up; Un)$$

If the inference means 8 uses the reduced positive supply voltage Upr as a reference, then, in FIG. 5, there is no direct connection between the positive supply line carrying Upr and the corresponding power supply terminal 1 or 2 carrying Up. Instead, the positive supply line and the corresponding power supply terminal are connected through a voltage step down circuit. The corresponding table of values for the input voltage Us is:

$$pN: \quad Us = \frac{UnRu + UprRs}{Ru + Rs} \quad (Un; Upr)$$

$$nN: \quad Us = Un \quad (Un; Un)$$

$$pP: \quad Us = \frac{UpRu + UprRs}{Ru + Rs} \quad (Up; Upr)$$

$$nP: \quad Us = \frac{UnRs + UpRd}{Rd + Rs} \quad (Up; Un)$$

Instead of a stepped-down positive supply voltage, in an analogous fashion a stepped-up negative supply voltage may be used alternatively or additionally. The corresponding voltage values and method steps are derived in a similar fashion.

If the orientation of the battery 3 is known, then, by definition, it is known which of the two columns of FIG. 5 and of the above array of equations is relevant. The orientation of the battery 3 is determined either by the rectifier status detection means 13 or by closer analysis of the values of the input voltage Us. It shall now first be shown how the rectifier status detection means 13 is implemented and its information is used;

In a first preferred embodiment of the invention, the Orientation of the battery 3 is determined by the rectifier status detection means 13. The rectifier status detection means 13 comprises e.g. a comparator circuit arranged to compare the positive supply voltage Up at the positive supply line 12 with the voltage at the second power supply terminal 2, as indicated in FIG. 3. If said voltages are substantially equal, taking into account a voltage difference caused by the rectifier circuit 6, then the rectifier state corresponds to the second power supply terminal 2 being connected to the positive supply line 12 and the first power supply terminal 1 being connected to the negative supply line 11. This state corresponds to the left hand column of FIG. 5 and shall be called a first state of the rectifier circuit 6. The opposite state corresponds to the right hand column of FIG. 5 and shall be called a second state of the rectifier circuit 6.

Throughout the application, "substantially equal" means that the difference between two values is smaller than a predetermined threshold. The threshold value depends on the circumstances, e.g. on parasitic impedances, losses, etc and on the use of stepped down or stepped up voltages. The term "electrically connected" indicates a connection without significant impedance.

Of course, the rectifier status detection means 13 can alternatively be arranged to compare the positive supply voltage Up to the voltage at the first power supply terminal 1, or the negative supply voltage Un to the voltage at the second power supply terminal 2, etc . . . , with corresponding changes to the inferred state of the rectifier circuit 6. In any case, a rectifier status signal Sr representative of said state is communicated to the inference means 8.

The rectifier status detection means 13 can be implemented as one of the jointly powered components 14 and also on a common integrated circuit 5, but it may also be implemented as part of the rectifier circuit 6 itself and/or as part of the electronic circuit assembly 4 outside the integrated circuit 5. The electrical connection between the rectifier status detection means 13 and the second power supply terminal 2 (or the first power supply terminal 1, respectively) may be established on the integrated circuit 5 itself, or it may be established by contacting the second power supply terminal 2 at a contact point on the electronic circuit assembly 4 and establishing a line from said contact point via a connector of the integrated circuit 5 to the rectifier status detection means 13 located on the integrated circuit 5. It may in principle also be established outside the hybrid circuit assembly 4, but then an additional IO contact is required.

Given the rectifier status Sr, it is known which column applies. Since in the configurations pP and nN the input voltage Us does not provide any information, the configuration pN or nP is selected, depending on the value of the rectifier status signal Sr. The value of the variable resistance Rs is determined according to the corresponding equation, or the status of the input means 9 is determined directly according to the rectifier status.

For example, if the rectifier is in the first state, then the configuration pN is selected by the resistor connection controller 81. For the input means 9 being a variable resistance, its value Rs is $$Rs = Ru\frac{Us - Un}{Up - Us}.$$

The same holds if the positive supply voltage is reduced. This value or a corresponding logarithmic representation is computed by digital or analog means and communicated as input status signal Si to the primary function means 7. Usually, the negative supply voltage Un may be considered to be zero.

If the rectifier is in the first state and for the input means 9 being a switch 91 then if the input voltage Us is substantially equal to the (possibly reduced) positive supply voltage Up, then the switch 91 is open, and if the input voltage Us is substantially equal to the negative supply voltage Un, then the switch 91 is closed.

Analogous procedures are followed for the rectifier circuit 6 being in the second state.

In other preferred embodiments of the invention, there are no rectifier status detection means 13, and the rectifier status is determined either by the status determining means 83, or the input status signal Si is determined without explicitly determining the rectifier status.

When status determining means 83 are present, the rectifier status signal Sr is preferably determined by the resistor connection controller 81 toggling the connection of the input line 15 from the pull-up resistor Ru to the pull-down resistor Rd and back again, by alternately closing and opening the corresponding switches.

This implementation is advantageous since it may use pre-configured IC input circuitry comprising pull-up and pull-down resistors and transistor switches to connect either of them to an input line.

Depending on the state of the rectifier circuit 6, this toggling action causes the input voltage Us to toggle between the two values in either the left hand (pN,nN) or the right hand column (pP,nP) of the above array of formulae. The toggling action is either performed constantly during the operation of the hearing aid, or it is stopped when the status of the rectifier circuit 6 is determined and the input line 15 may be left, according to said status, connected to one of the pull-up resistor Ru or pull-down resistor Rd. The toggling frequency can lie in the range of several Hz to several kHz.

If the input means 9 comprises a variable or constant resistance, then its value (Rs or Ri) should not be arbitrarily small or arbitrarily large with respect to the pull-up resistance Ru and the pull-down resistance Rd. If this condition is satisfied, then it follows that if the input voltage Us alternates between the negative supply voltage Un and a first intermediate value, then the rectifier circuit 6 is in the first state, and the value of the resistance of the input means 9 or a corresponding input status signal Si is determined according to the equation for configuration pN as shown previously; and if the input voltage Us alternates between the positive supply voltage Up and a first intermediate value, then the rectifier circuit 6 is in the second state, and the value of the resistance of the input means 9 or a corresponding input status signal Si is determined according to the equation for configuration nP.

If the positive supply voltage is reduced, then for the rectifier being in the second state, the input voltage Us alternates between a reduced reference voltage equal to (UprRs+UpRu)/(Ru+Rs) and the first intermediate value.

Said intermediate values, as determined by the formulae for the configurations pN and nP respectively, lie between the negative supply voltage Un and the positive supply voltage Up (or the reduced reference voltage) and are substantially different from both.

FIGS. 6 and 7 show alternative embodiments of input means. FIG. 6 corresponds to a switch 91 in series with an input resistance Ri. The switch 91 may be a non-latching push button, providing a contact only when it is pushed, or it may be a latching switch 91. If the switch 91 is closed, i.e. in a conducting state, then the formulae shown above apply with the variable resistance Rs equal to the input resistance Ri. If the switch 91 is open, i.e. in a nonconducting state, then the formulae apply with the variable resistance Rs equal to infinity.

If the input means 9 comprises a switch 91, this corresponds to the variable resistance Rs being either equal to the input resistance Ri or equal to infinity, according to the state of the switch 91. In this embodiment of the invention, when toggling the connection of the input line 15, if the input voltage Us alternates between the negative supply voltage Un and the (possibly reduced) positive supply voltage Up, then the switch 91 is known to be open, regardless of the state of the rectifier circuit 6; and if either the input voltage Us alternates between the positive supply voltage Up (or the reduced reference voltage) and a first intermediate voltage, or if the input voltage Us alternates between the negative supply voltage Un and a second intermediate voltage, then the switch 91 is known to be closed.

The condition for the second case can also be expressed as "if one of the voltages between which the input voltage Us alternates is substantially different from both the (possibly reduced) positive supply voltage Up and the negative supply voltage Un, then the switch 91 is deter-mined as being closed."

In this second case, the status of the rectifier circuit 6 is optionally determined according to the value of the intermediate voltage This necessitates that the input resistance Ri is substantially different from at least one of the pull-up resistor Ru or the pull-down resistor Rd.

Note that the input resistance Ri was so far described as being part of the input means 9, but can alternatively be incorporated on the electronic circuit assembly 4 or in the integrated circuit 5. In reality, due to corrosion, a switch will always have a residual series resistance. Also, due to soiling the contacts, an open switch may have a resistance smaller than infinity. If these conditions become relevant, then the tolerances regarding equality of voltages and comparisons with reference values are adjusted accordingly.

In an alternative preferred embodiment of the invention, the input resistance Ri in series with the switch 91 is zero or close to zero, so the input means 9 corresponds to the switch as shown in FIGS. 1 and 2. In this embodiment, closing the switch 91 forces the input voltage Us to the voltage level of the battery terminal to which the switch 91 is connected. In this embodiment of the invention, when toggling the connection of the input line 15, regardless of the state of the rectifier circuit 6, if the input voltage Us alternates between the negative supply voltage Un and the positive supply voltage Up, then the switch 91 is known to be open; and if the input voltage Us remains substantially constant at either the positive supply voltage Up or the negative supply voltage Un, then the switch 91 is known to be closed.

The conditions for the last two embodiments discussed, i.e. with the input resistance Ri being either nonzero or zero, may be combined to a condition that holds for both embodiments: When toggling the pull-up/pull-down connections, if the input voltage Us alternates between the negative supply voltage Un and the (possibly reduced) positive supply voltage Up, then the switch 91 is known to be open; and otherwise the switch 91 is known to be closed.

FIG. 7 corresponds to a signal source for e.g. data transmission. The signal source is modeled as a voltage source with an internal or input resistance Ri. Such a signal source, or several signal sources are typically implemented in a programming device outside the hearing aid 10.

Figure 8:
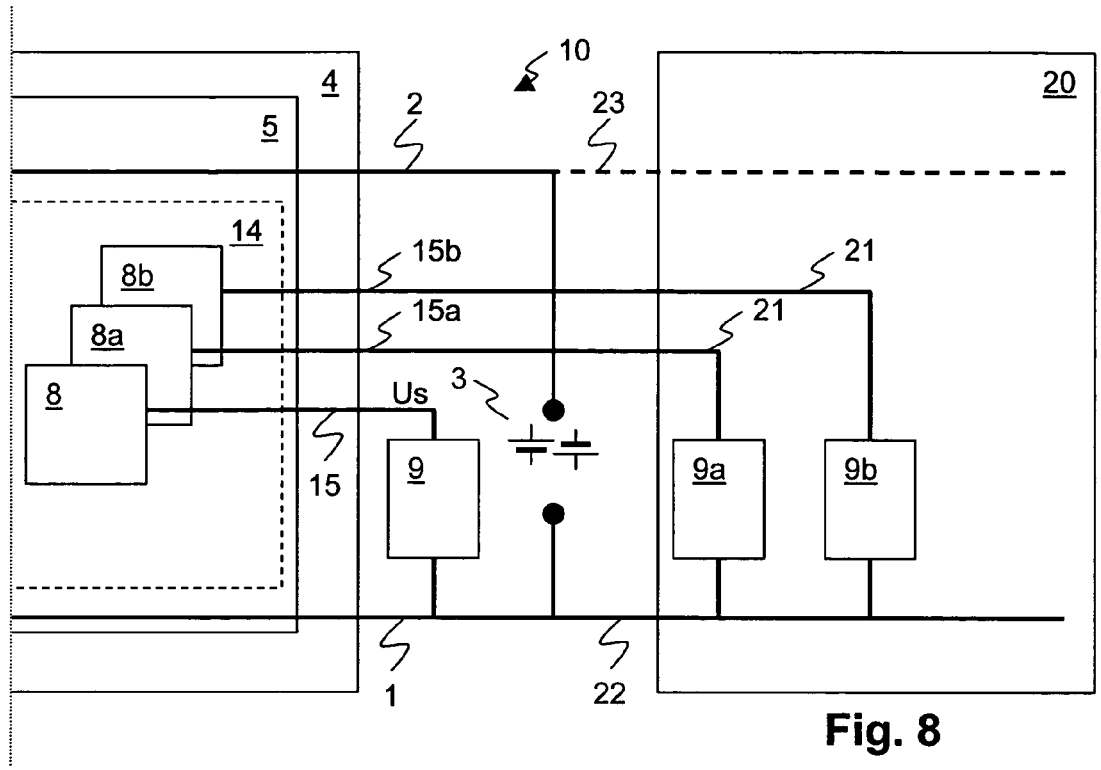
FIG. 8 shows a configuration of a programming device with the hearing aid.

One preferred embodiment when using a programming device 20 is shown schematically in FIG. 8. The programming device 20 contacts the hearing aid 10 through a programming cable comprising one or more communication lines 21 and a reference line 22. In accordance with the invention, the reference line 22 is connected to one of the power supply terminals 1,2, and the communication lines 21 are connected to corresponding input/output (IO) or interface lines 15a,15b. Optionally, an additional supply line 23 from the programming device 20 is provided and configured to contact the other power supply terminal in addition to the one contacted by the reference line 22.

The communication lines 21, in a preferred embodiment of the invention, implement a serial bus, in which one communication line 21 provides a clock signal and the other one a data signal. For example, for each communication line 21, in the hearing aid 10 or in the programming device 20, a pull-up resistor pulls the line voltage to a certain level. Clock or data signals are placed on the bus by any of the devices by pulling the line voltage down, e.g. with a transistor switch. Further details regarding communication protocols, arbitration mechanisms etc. may follow existing standards and methods.

It is now necessary to take into account
- that the battery orientation in the hearing aid 10 may vary, and/or
- that the connection of the programming cable to the hearing instrument 10 may be mechanically configured such that there is only one way to connect it, or that the programming cable may be inserted one way or the other, and/or
- that the hearing aid 10 may be programmed with or without a battery 3 being inserted in the hearing aid 10. In the later case, without a battery, the programming device may provide the supply voltage to the hearing instrument via the programming cable.

If the programming takes place with the hearing aid 10 being powered by a battery 3 inserted in the hearing instrument, then the programming device 20 has to deliver/receive the input signals (in case of the preferred embodiment these are data and clock) at voltage levels relative to the rectified supply within the hearing aid 10. The programming device 20 could have one or both unrectified supply lines, i.e. from the power supply terminals from the hearing aid 10 available on the programming cable. The programming device 20 has to detect the status of the rectifier 6 and accordingly adapt the level of the signals to the hearing aid 10 and the threshold for sampling the signals from the hearing aid 10.

If both power supply terminals 1,2 are contacted by the programming device 20, the rectifier status can be detected according to the polarity of the voltage between said terminals.

If only one power supply terminal is contacted (through the reference line 22), then its voltage is compared with the voltage on the communication lines 21: As mentioned above, the data and the clock lines 21 are pulled up to the positive supply voltage Up in the hearing aid 10. So if the voltage of the reference line 22 and of the signal lines 21 is the same, then the reference line 22 is connected to the power supply terminal which is, via the rectifier 6, connected to the positive supply line. If the voltages are different, then the reference line 22 is connected to the power supply terminal corresponding to the negative supply line. Analogous reasoning holds if the communication lines 21 would be pulled up to a reduced positive supply voltage.

This reasoning is correct regardless of which of the power supply terminals the reference line 22 is connected to. So if there are several different ways to connect a programming cable, causing supply contacts and communication lines to be interchanged, respectively, then the hearing aid 10 must only associate each of the communication lines 21 with the correct communication function, that is, it must detect which of the communication lines 21 is the clock and which is the data line. This can be done by having, in a start up phase, the programming device 20 send clock signals on the clock line. The hearing aid 10 notices which input line 15a,15b this is and regards it henceforth as being the clock line. In our application the programmer will be sending, and the hearing instrument will be detecting a more complex signal, involving both clock and data signals. The hearing instrument is also trying to detect these cock and data signals on a larger set of input lines ( 15a, 15b and also most signal lines 15). This method to associate communication lines with their correct function may also be implemented independently from the polarity or rectifier status detection.

If the power supply is not provided by a battery 3 but through the programming cable, and if the connection of the programming cable to the 10 is mechanically configured such that there is only one way to connect it, there are no ambiguities to be resolved.

However, if the programming cable can be inserted the wrong way around, then supply polarity could change, and communication lines 21 providing different functions (such as data and clock) could be interchanged. In this case, the hearing aid 10 is configured to detect the polarity of the supply, i.e. the programming cable in one of the manners described previously, e.g. by determining the status of the rectifier 6 directly or via the status of another input device 9 of the hearing aid 10. The functions of the IO lines 15a, 15b are then assigned according to the status of the rectifier 6. With reference to FIG. 1, this means that the rectifier status signal Sr ist transmitted from the inference means 8 associated with an input device 9 of the hearing aid 10 itself to the primary function means 7, alongside the input status signal Si.

In a further group of embodiments of the invention, the input line 15 is electrically connected, via a resistor, to the second power supply terminal 2, i.e. to a conductor which is connected to the second power supply terminal 2 and carries the same voltage. Depending on the polarity of the battery 3, this resistor operates as either a pull-up or a pull-down resistor, and shall therefore be denoted simply as a pull resistance Rp. The configuration of the input means 9 and the inference means 8 is then by definition electrically equivalent to one of the configurations pN or nP. If rectifier status detection means 13 are present, the interpretation of the input voltage Us, in view of the preceding explanations, is straightforward. The following embodiments concern the case when no rectifier status detection means 13 are present.

If the input means 9 is a switch 91 without a significant series resistance, then in both possible configurations a state change of the switch causes the input voltage Us to change from the negative supply voltage Un to the positive supply voltage Up or vice versa. From this alone, it is not possible to determine the configuration or, respectively, the status of the rectifier circuit 6.

In one preferred embodiment of said group of embodiments, the status of the rectifier circuit 6 is determined heuristically by considering a time history of the input voltage Us. For a non latching switch, it is determined that if the switch remains unchanged in a specific state for a predetermined length of time, e.g. for several minutes, that this state corresponds to the switch not being operated, i.e. depressed. This determination of switch status and implicitly of the rectifier circuit 6 status can be performed after a power-up routine when a battery is inserted, and/or at predetermined time intervals. The switch 91 and rectifier circuit 6 status as determined in this manner then remain valid until the battery is removed.

In another preferred embodiment of said group of embodiments, an input resistance Ri is arranged in series with the switch 91. Similar to corresponding configurations explained in the above, it follows for this embodiment, that
- the switch 91 is determined as being open or nonconducting if the voltage on the input line 15 is substantially equal to either the positive supply voltage Up or the negative supply voltage Un, and
- otherwise the status of the switch 91 is determined as being closed or conducting.

In another preferred embodiment of said group of embodiments, the input means 9 is a variable resistance Rs. The values of the pull resistance Rp and the range of the variable resistance Rs are chosen such that it is always possible to unambiguously distinguish between the two configurations pN and nP corresponding to different battery polarities. This condition is satisfied e.g. if the range of the variable resistance Rs does not comprise the value of the pull resistance Rp.

For example, the maximal range of the variable resistance Rs is preferably from zero to slightly less than the pull resistance Rp. If the variable resistance Rs were equal to the pull resistance Rp, the input voltage Us would be, regardless of the status of the rectifier circuit 6, equal to an average voltage (Un+Up)/2 between the negative supply voltage Un and the positive supply voltage Up. As a result, in this embodiment, if the input voltage Us is lower than the average voltage, it follows that the first terminal of the input means 9 is connected—via the rectifier circuit 6—to the negative supply voltage Un, that the rectifier circuit 6 is in the first state, and that the variable resistance Rs is computed according to the equation corresponding to configuration pN; and if the input voltage Us is higher than the average voltage, it follows that the first terminal of the input means 9 is connected—via the rectifier Circuit 6—to the positive supply voltage Up, that the rectifier circuit 6 is in the second State, and that the variable resistance Rs is computed according to the equation corresponding to configuration nP.

Figure 9:
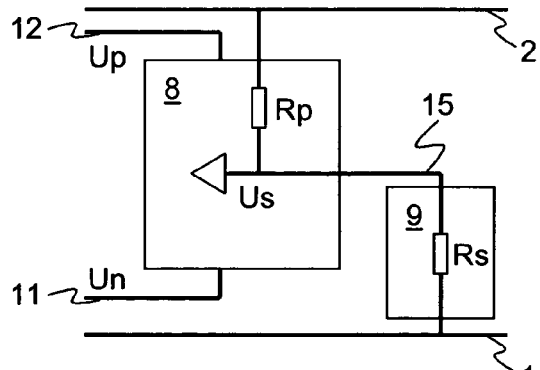
FIGS. 9 to 11 show further structures of inference means according to other preferred embodiments of the invention.
Figure 10:
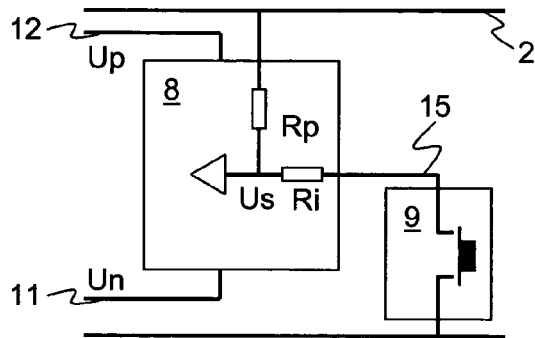
Figure 11:
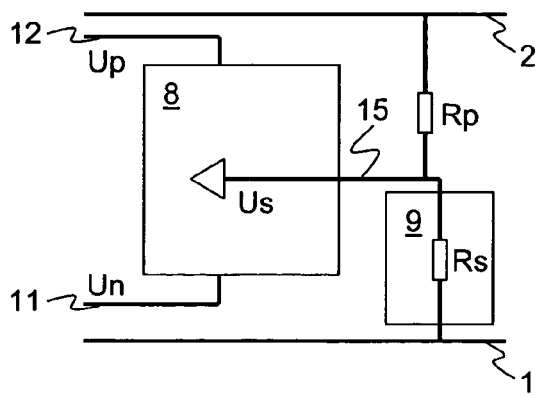

Either of the input resistance Ri as well as the pull resistance Rp may be located as a discrete component outside the electronic circuit assembly 4, as a component on the electronic circuit assembly 4, or as part of the integrated circuit 5. FIGS. 9, 10 and 11 show corresponding further structures of inference means 8 combined with input means 9 according to other preferred embodiments of the invention. Note that, in contrast to the simplified structures of FIG. 5, the actual, direct connection, that is, not leading through the rectifier circuit 6, of the pull resistance Rp to the second power supply terminal 2 is shown. In FIG. 9 the pull resistance Rp is arranged in the inference means 8 and the input means 9 comprises a variable resistance Rs. In FIG. 10 the input means 9 comprises a switch 91, and the resistance Ri in series with the switch 91 is arranged in the inference means 8. In FIG. 11 the pull resistance Rp is not part of the inference means 8. Numerous other modifications and combinations are possible without leaving the scope of the invention.

In further preferred embodiments of the invention one or more of the pull-up or pull-down resistors mentioned above are substituted by a current source circuit or a current sink circuit, respectively. Such a Circuit is implemented e.g. by a transistor with a constant gate voltage. A current source circuit replacing a pull-up resistor is arranged to feed a current into the input line 15, while a current sink circuit replacing a pull-down resistor is arranged lo draw a current from the input line 15.

Such current circuits do not, provide an ideal constant current: For example, consider a current source circuit drawing, via a first terminal of the circuit, a current from a positive supply voltage. Then, if the second terminal of the circuit is connected, via a resistance, to the positive supply voltage as well, the current will become zero and the voltage at the second terminal will settle at the positive supply voltage.

When replacing the resistors in FIG. 5 by such current circuits providing or drawing a current Ic, the corresponding table of values for the input voltage Us is:
pN: Un+IcRs (Un;Up) pP: Up (Up;Up)
nN: Un (Un;Un) nP: Up−IcRs (Up;Un)

Similar values follow for a reduced positive supply voltage. The methods for determining the status of the rectifier 6 and of different input means 9 explained above remain essentially the same. The formula for determining the value of a variable resistance Rs from a measurement of the input voltage Us is of course modified according the above table.

Other known engineering techniques and standard circuit elements for e.g. debouncing etc. are incorporated in the circuits and methods described, giving rise to appropriate modifications.

While the invention has been described in present preferred embodiments of the invention, it is distinctly understood that the invention is not limited thereto, but may be otherwise variously embodied and practised within the scope of the claims.

Although the features and advantages of the invention are explained in terms of hearing instruments, they may be applied in an analogous fashion to arbitrary other devices in which the objects according to the invention arise.

| List of designations | |
|---|---|
| 1 | first power supply terminal |
| 2 | second power supply terminal |
| 3 | battery |
| 4 | electronic circuit assembly (hybrid) |
| 5 | integrated circuit |
| 6 | rectifier circuit |
| 7 | primary function means |
| 8 | inference means |
| 9 | input means |
| 10 | hearing instrument, electronic battery-powered apparatus or component |
| 11 | negative supply line |
| 12 | positive supply line |
| 13 | rectifier status detection means |
| 14 | jointly powered components |
| 15 | input line |
| 15a, 15b | IO lines |
| 20 | programming device |
| 21 | communication line |
| 22 | reference line |
| 23 | additional supply line |
| 81 | resistor connection controller |
| 82 | high input impedance amplifier |
| 83 | status determining means |
| 91 | switch |
| Rd | pull-down resistor |
| Ri | input resistance |
| Rp | pull resistance |
| Rs | variable resistance |
| Ru | pull-up resistor |
| Si | input status signal |
| Sr | rectifier status signal |
| Ui | source voltage-only for programming device |
| Un | negative supply voltage |
| Up | positive supply voltage |
| Us | input voltage |

The invention claimed is:

1. A method for operating an electronic battery-powered hearing instrument, comprising the steps of:

providing primary function means with power from the battery via a first power supply terminal and a second power supply terminal, and via a rectifier circuit for providing a positive supply voltage and a negative supply voltage regardless of the polarity of the battery relative to the first and second power supply terminals, the rectifier circuit and primary function means being part of an electronic circuit assembly, inferring a status of at least one interface means, wherein a first terminal of the interface means is electrically connected to the first power supply terminal externally of the electronic circuit assembly to communicate both a signal from the first terminal of the interface means to the electronic circuit assembly and power between the first power supply terminal and the electronic circuit assembly via a shared IO contact provided to the electronic circuit assembly, and a second terminal of the interface means is electrically connected to at least one interface line, wherein said status of the at least one interface means is inferred from a voltage of the interface line, and communicating said status of the interface means to the primary function means, wherein the interface means serves for the input of information into the hearing aid or for bidirectional communication with the hearing aid and the interface means is not part of the electronic circuit assembly and is not identical to the battery.

2. The method according to claim 1, further comprising the step of determining a status of the rectifier circuit as being either in a first state or a second state, wherein the first state corresponds to the first power supply terminal being connected to the negative terminal of the battery and the second power supply terminal being connected to the positive terminal of the battery, and the second state corresponds to the first power supply terminal being connected to the positive terminal of the battery and the second power supply terminal being connected to the negative terminal of the battery.

3. The method according to claim 2, wherein the step of determining the status of the rectifier circuit comprises one of the steps of comparing the voltage of one of the power supply terminals with the positive supply voltage or with a reduced positive supply voltage, and, if said voltages are substantially equal, inferring that said supply terminal is connected to the positive terminal of the battery, and otherwise inferring that said supply terminal is connected to the negative terminal of the battery, or comparing the voltage of one of the power supply terminals with the negative supply voltage, and, if said voltages are substantially equal, inferring that said supply terminal is connected to the negative terminal of the battery, and otherwise inferring that said supply terminal is connected to the positive terminal of the battery.

4. The method according to one of claims 2 or 3, further comprising the steps of, if the status of the rectifier corresponds to the first power supply terminal being connected to the positive terminal of the battery, then connecting the interface line to a pull-down resistor or a current sink circuit which is electrically connected to the negative supply voltage, or else, if the status of the rectifier corresponds to the first power supply terminal being connected to the negative terminal of the battery, then connecting the interface line to a pull-up resistor or a current source circuit which is electrically connected to the positive supply voltage.

5. The method according to claim 1, further comprising the step of toggling a connection of the interface line between a pull-up resistor or a current source circuit electrically connected to the positive supply voltage and a pull-down resistor or a current sink circuit electrically connected to the negative supply voltage, and determining at least one of the status of the input and or the status of the rectifier means according to the two values of the input voltage corresponding to the two toggled states.

6. The method according to claim 5, where the interface means is an input means and is an electrical switch and further comprising the step of, when toggling the connection of the interface line, determining the status of the switch as being conducting if the voltage on the interface line does not change substantially, and determining the status of the switch as being nonconducting if the voltage on the interface line does change substantially within the limits of the supply voltage.

7. The method according to claim 5, where the input means is a variable resistor, and the status of the input means corresponds to an analog value proportional to the value of the resistor, and further comprising the step of, when toggling the connection of the interface line, determining, if one of the two values of the input voltage corresponding to the two toggled states is substantially equal to the positive supply voltage or to a predetermined reduced reference voltage, the status of the input means as a first function of the other one of the two values of the input voltage, or if one of the two values of the input voltage corresponding to the two toggled states is substantially equal to the negative supply voltage, the status of the input means as a second function of the other one of the two values of the input voltage.

8. The method according to claim 6 or 7, further comprising the step of determining a status of the rectifier circuit as being either in a first state or a second state, wherein the first state corresponds to the first power supply terminal being connected to the negative terminal of the battery and the second power supply terminal being connected to the positive terminal of the battery, and the second state corresponds to the first power supply terminal being connected to the positive terminal of the battery and the second power supply terminal being connected to the negative terminal of the battery and where the status of the rectifier is determined to be in the first state, if one of the two values of the input voltage corresponding to the two toggled states is substantially equal to the negative supply voltage, in the second state, if one of the two values of the input voltage corresponding to the two toggled states is substantially equal to the positive supply voltage or to a predetermined reduced reference voltage.

9. The method according to claim 1, where the interface line is electrically connected, via a pull resistor, to the second power supply terminal.

10. The method according to claim 9, where the interface means is an input means and is an electrical switch in series with an input resistor and further comprising the step of, determining the status of the switch as being nonconducting if the voltage on the interface line is substantially equal to either the positive or the negative supply voltage, and otherwise determining the status of the switch as being conducting.

11. The method according to claim 9, where the input means is a variable resistor, and the status of the input means corresponds to an analog value proportional to the value of the resistor, and further comprising the step of, if the input voltage lies within a first predetermined voltage range, determining the status of the input means as a first function of the input voltage, or if the input voltage lies within a second predetermined voltage range, determining the status of the input means as a second function of the input voltage.

12. The method according to one of claims 1 to 3, wherein the hearing aid comprises at least two interface lines and further comprising the step of associating interface lines with predetermined communication functions.

13. The method according to claim 12, wherein the interface lines are associated with predetermined communication functions according to a status of the rectifier circuit.

14. The method according to claim 12, wherein the interface lines are associated with predetermined communication functions by performing, in the hearing aid, measurements of signals on the interface lines and associating the communication functions accordingly.

15. An electronic battery-powered hearing instrument comprising
- a first power supply terminal and a second power supply terminal arranged to contact a battery,
- a rectifier circuit for providing a positive supply voltage and a negative supply voltage regardless of a polarity of the battery relative to the first and second power supply terminal,
- an electronic circuit assembly comprising the rectifier circuit, primary function means and at least a first IO contact electrically connected to the first power supply terminal and a second IO contact electrically connected to the second power supply terminal for conducting power between the battery and the electronic circuit assembly,
- the primary function means being arranged to be powered by the positive and negative supply voltage, and
- at least one interface means for inputting information into the hearing instrument or for facilitating a bidirectional communication with the hearing instrument, wherein the at least one interface means comprises a first terminal electrically connected to the first power supply terminal externally of the electronic circuit assembly and to the first IO contact,
- wherein the interface means is not part of the electronic circuit assembly and is not identical to the battery and a second terminal of the interface means is electrically connected to an interface line which is electrically connected, via an IO contact of the electronic circuit assembly, to an inference means arranged on the electronic circuit assembly and configured to determine a status of the interface means from a voltage of the interface line.

16. The hearing instrument according to claim 15, comprising means for connecting the interface line to either a pull-up resistor or a current source circuit connected to the positive supply voltage, or to a pull-down resistor or a current sink circuit connected to the negative supply voltage.

17. The hearing instrument according to claim 16, comprising means for determining the status of the interface means according to whether the voltage of the interface line changes substantially when it is switched from the pull-up resistor or the current source circuit to the pull-down resistor or the current sink circuit, or vice versa.

18. The hearing instrument according to claim 16, comprising means for comparing a voltage of one of the power supply terminals to one of the positive or negative supply voltage and for controlling the connection of the interface line to the pull-up resistor or current source circuit, or the pull-down resistor or current sink circuit accordingly.

19. The hearing instrument according to claim 16, comprising a resistor connecting the interface line to the second power supply terminal, an optional high input impedance amplifier for determining a decoupled input voltage corresponding to the input voltage, and comparison means for comparing the optionally decoupled input voltage to at least one of the positive or the negative supply voltage.

20. The hearing instrument according to one of claims 15 to 19, wherein the interface means is an input means and is an electrical switch or a resistor in series with an electrical switch or a variable resistor.

* * * * *

UNITED STATES PATENT AND TRADEMARK OFFICE
CERTIFICATE OF CORRECTION

PATENT NO. : 7,515,725 B2
APPLICATION NO. : 10/794018
DATED : April 7, 2009
INVENTOR(S) : Martin Fluit Page 1 of 1

It is certified that error appears in the above-identified patent and that said Letters Patent is hereby corrected as shown below:

In the Specification, column 3, line 6, please replace the word "mean,s" with -- means, --.

In the Specification, column 7, line 43-44, please replace the word "Orientation" with -- orientation --.

In the Specification, column 10, line 3, please replace the word "deter-mined" with -- determined --.

In the Specification, column 13, line 19, please replace the word "Circuit" with -- circuit --.

In the Specification, column 13, line 21, please replace the word "State" with -- state --.

In the Specification, column 13, line 45, please replace the word "Circuit" with -- circuit --.

In the Specification, column 13, line 49, please replace the word "lo" with -- to --.

In the Specification, column 13, line 51, please remove the comma after the word "not" and before the word "provide".

Signed and Sealed this

Twenty-fifth Day of August, 2009

David J. Kappos
*Director of the United States Patent and Trademark Office*